United States Patent
Deparis et al.

(10) Patent No.: US 11,084,459 B2
(45) Date of Patent: Aug. 10, 2021

(54) DRIVING AUTHORIZATION SYSTEM

(71) Applicant: DAIMLER AG, Stuttgart (DE)

(72) Inventors: Daniel Deparis, Ostfildern (DE);
Jan-Peter Langer, Böblingen (DE);
Jakob Luickhardt, Stuttgart (DE);
Markus Rossmann, Atlanta, GA (US);
Gabriele Galwas, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/976,224

(22) PCT Filed: Feb. 12, 2019

(86) PCT No.: PCT/EP2019/053393
§ 371 (c)(1),
(2) Date: Aug. 27, 2020

(87) PCT Pub. No.: WO2019/166216
PCT Pub. Date: Sep. 6, 2019

(65) Prior Publication Data
US 2021/0001805 A1    Jan. 7, 2021

(30) Foreign Application Priority Data
Feb. 28, 2018    (DE) ..................... 10 2018 001 558.1

(51) Int. Cl.
*B60R 25/20*    (2013.01)
*B60R 25/04*    (2013.01)
(Continued)

(52) U.S. Cl.
CPC .......... *B60R 25/2018* (2013.01); *B60R 25/04* (2013.01); *B60R 25/102* (2013.01);
(Continued)

(58) Field of Classification Search
None
See application file for complete search history.

(56) References Cited

U.S. PATENT DOCUMENTS 6,549,115 B1    4/2003    Daiss et al.
9,371,056 B2    6/2016    Lunstedt et al.
(Continued)

FOREIGN PATENT DOCUMENTS

DE    102012101836 A1    9/2013
DE    102012015925 A1    3/2014
(Continued)

OTHER PUBLICATIONS

Machine Translation of DE102014204762, WIPO Google Patent Translation, 2014 (Year: 2021).*
(Continued)

*Primary Examiner* — Carlos Garcia
(74) *Attorney, Agent, or Firm* — Patent Portfolio Builders PLLC

(57) ABSTRACT

A driving authorization system for a vehicle includes a connectivity unit for communication at least with a key and a keyless access authorization system. A server has an access lock, which can be activated or deactivated by the key and/or the keyless access authorization system. The keyless access authorization system is an application on a mobile device, further having an immobilizer. The immobilizer is designed in such a way that it is activated when the access lock is activated by the application and is deactivated again in this case only when the access lock is deactivated by the application.

7 Claims, 1 Drawing Sheet

Figure 1:
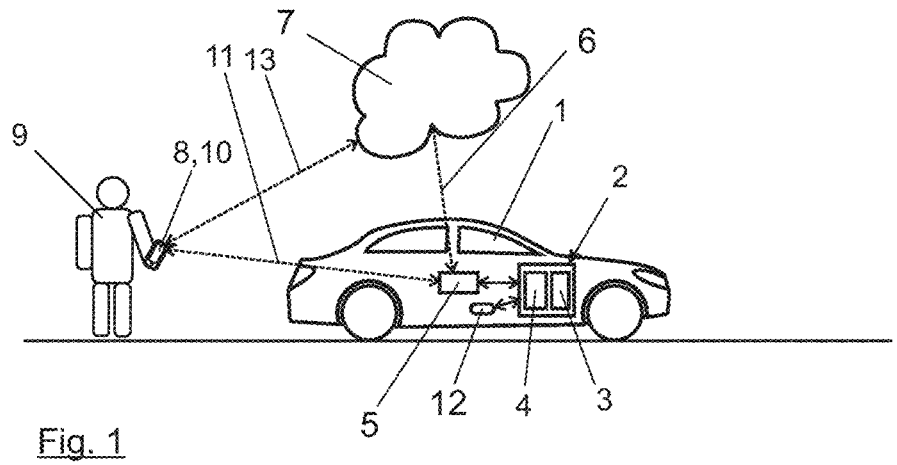

(51) Int. Cl.
  *B60R 25/102* (2013.01)
  *B60R 25/24* (2013.01)
(52) U.S. Cl.
  CPC ...... *B60R 25/24* (2013.01); *B60R 2025/0415* (2013.01); *B60R 2325/205* (2013.01)

(56) References Cited

U.S. PATENT DOCUMENTS

| | | | |
|---|---|---|---|
| 9,466,162 B2 | 10/2016 | Nakai et al. | |
| 9,499,128 B2 * | 11/2016 | Reh | G06Q 10/02 |
| 2009/0031418 A1 * | 1/2009 | Matsuda | G06F 12/1483 |
| | | | 726/21 |

FOREIGN PATENT DOCUMENTS

| | | |
|---|---|---|
| DE | 112011105869 T5 | 8/2014 |
| DE | 102014204762 A1 | 9/2015 |
| DE | 102016106990 A1 | 10/2017 |

OTHER PUBLICATIONS

Smart, "smart ready to share," https://www.smart.com/de/de/index/smart-ready-to/share.html; retrieved Nov. 27, 2017.
International Search Report dated Jun. 4, 2019 in related/corresponding International Application No. PCT/EP2019/053393.
Office Action created on Aug. 3, 2018 in related/corresponding DE Application No. 10 2018 001 558.1.
Written Opinion dated Jun. 4, 2019 in related/corresponding International Application No. PCT/EP2019/053393.

* cited by examiner

DRIVING AUTHORIZATION SYSTEM

BACKGROUND AND SUMMARY OF THE INVENTION

Exemplary embodiments of the invention relate to a driving authorization system for a vehicle. Furthermore, exemplary embodiments of the invention relate to a method for securing a vehicle against unauthorized driving, wherein the vehicle has a driving authorization system according to the invention.

In principle, driving authorization systems are known from prior art. By way of example, such a system is described in U.S. Pat. No. 6,549,115 B1. On the vehicle side, there is an access lock and an immobilizer, which can each be activated and deactivated by a vehicle key and/or a keyless access authorization system in the form of a smartcard. The key has absolute priority over the smartcard.

Furthermore, car-sharing projects are known in the prior art, for example a private car-sharing via an application on a mobile device, a so-called app. In this context, reference is made to the website https://www.smart.com/de/de/index/smart-ready-to/share.html. A download from November 2017 of this website shows a system for car-sharing via an application/app, in which a car owner can share the use of his/her vehicle with friends and colleagues via the Internet, provided it is equipped with a corresponding connectivity unit. They can then reserve the vehicle via an application on their mobile device at times specified by the vehicle owner. Once the vehicle owner has accepted the reservation, the user can open and close the vehicle via the app.

At the time of this application, the advertised service is in the customer trial phase. Further technical details about the functionality are not known to the customers. The customer trial serves to assess the maturity of the service advertised as ready to share. The service is only introduced in series after the successful completion of the customer trial and after the filing date of this application.

Details according to the invention of how the systems installed in the vehicle interact with the app and a background system are not disclosed. In particular, it is not disclosed how the access system would have to cooperate with the immobilizer in order for the advertised service to actually be able to function.

A keyless transfer is required for effective use, which is why the or one of the vehicle key(s) must remain in the vehicle. For this reason, the principle concern for many people is the potential theft of the vehicle, which then appears relatively simple due to the keys present in the vehicle. There is also the risk of unauthorized re-use by a previously authorized user who takes the key from the vehicle without authorization when the vehicle is parked. Furthermore, it must be ensured that after successfully accessing the vehicle, the vehicle can also be started and that the immobilizer does not continue to block the use of the vehicle.

Furthermore, reference can also be made to DE 10 2012 015 925 A1, which shows an access authorization system that allows several users to use a vehicle in a coordinated manner. Here, a radio key remains in the vehicle. The different users have to coordinate with each other and, as participants in a sharing system, they receive a handheld transmitter, which can be formed a mobile phone. In order to be able to influence the access system, the handheld transmitters communicate either directly with the radio receiver in the vehicle, or indirectly by the handheld transmitters first communicating with a control center and the control center then communicating with the radio receiver in the vehicle. The radio receiver then actuates a mechanical control element in the radio key receiver. The control element acts on the radio key on the push button for the central locking system and thus unlocks the vehicle's access system. However, if the vehicle is broken into, the radio key is then available to the person breaking in. Admittedly, the removal from the radio key receiver can trigger an alarm on a server and can track the vehicle using GPS. Nevertheless, the vehicle can be stolen relatively easily.

In DE 10 2016 106990 A1, when the vehicle is locked with an NFC chip, the radio key, which remains in the vehicle, is deactivated and when the vehicle is opened with the NFC, the radio key in the vehicle is reactivated, such that the vehicle can be started with it. This has the disadvantage that an interface in the radio key must additionally be created.

Furthermore, DE 11 2011 105 869 T5 focuses on the distribution of purely electronic keys to the mobile phones of users who have made a reservation in a car sharing system or a hotel booking system. Here, the parallel use of an electronic key and a standard key system is provided. However, the document remains vague concerning this and does not disclose any technical solution as to how the electronic key and the standard key can be integrated into such a parallel operation.

Exemplary embodiments of the present invention are thus directed to a driving authorization system for a vehicle which creates a functionality which offers a higher level of protection against unauthorized use of the vehicle, for example, by theft of the vehicle or in the event of unauthorized opening of the vehicle.

The driving authorization system for a vehicle according to the invention combines a connectivity unit for communication with a key and a keyless access authorization system with an access lock and an immobilizer. At the same time, the connectivity unit enables a connection of the vehicle to a server, for example, the backend server of a vehicle manufacturer or a third-party provider. The driving authorization system according to the invention can be operated both via the—e.g., electronic—key and via a keyless access authorization system, which is designed as an application on a mobile device, e.g., as an app on a smartphone. The key and/or the keyless access authorization system can thereby activate an access lock for the vehicle, i.e., lock the vehicle, or deactivate it, i.e., open the vehicle. In accordance with the invention, it is now provided that the immobilizer is designed in such a way that it is activated by means of the application in the event of an activation of the access lock, i.e., locking of the vehicle, and is subsequently only deactivated when the access lock has also been deactivated again via the application, i.e., when the vehicle is unlocked again via the application. In this way, the application sends the locking command and the opening request via the backend server to the connectivity unit in the vehicle. The authorization check takes place in the backend server.

The additional immobilizer, also referred to as immobilizer, prevents an activation of the vehicle, such that it cannot be started and cannot be moved using its own power. Therefore, if the vehicle has been left with a key left in the vehicle, as required by the aforementioned private car-sharing option, the locking of the vehicle takes place, i.e., the activation of the access lock, not via the key, but via the application, such that the immobilizer is then activated at the same time in the case of the driving authorization system according to the invention. The access to the vehicle is also carried out again via the application, such that only when the access lock has been deactivated via the application does the immobilizer deactivate itself according to the status of the access lock. The driving authorization system thus makes it possible to prevent the vehicle from being driven away if it has been unlocked via the application in a way other than the planned way. In this case, the access lock can be deactivated, for example, even in the case of access via another key, but the immobilizer remains active, such that a vehicle cannot be moved using its own power in such a situation. Unauthorized use of the vehicle can thus be prevented. Although the vehicle can be opened by deactivating the access lock and, if necessary, the ignition can be switched on, the immobilizer, which remains active, prevents the engine from starting. In this case, the application can provide an appropriate indication that the immobilizer is still active. If the user of the application is authorized to drive the vehicle, he/she can deactivate the immobilizer in this case via his/her application if he/she has previously deactivated the access lock in another way in order to get into the vehicle.

Naturally, the user should be registered with the application and the application itself must have some form of security, such as a password, a pin or biometric security, for example by scanning a fingerprint, a face, an iris structure of the authorized user or similar.

Due to the driving authorization system according to the invention, increased security against unauthorized use of the vehicle is enabled. Security concerns can thus be eliminated and the fear of theft due to the key left in the vehicle can be minimized for the users. This ultimately increases the acceptance of such a use of the vehicle in car-sharing.

A very advantageous design of the driving authorization system according to the invention also provides that the connectivity unit is designed to receive, send and process commands and/or to trigger functions in the vehicle. The application can communicate with the connectivity unit via a backend. In order to provide maximum protection for the owner of the vehicle, the backend checks/verifies the authorization of the user and only then enables a communication between the user and the connectivity unit via the backend. If the authorization is present, the drive authorization system is released and the authorized user can open the vehicle and start it with the key located in the vehicle or an electric key shared with him/her.

For this purpose, the backend preferably enables the transmission of the driving authorization codes from the key or the electronic key, e.g., via the connectivity unit to the immobilizer or the immobilizer.

Furthermore, the connectivity unit is able to perform various functions of the vehicle. In this way, for example, a nearby user who is authorized to use the vehicle can have the location of his/her vehicle displayed via his/her application, or he/she can trigger a flashing of the vehicle in order to make the vehicle easier to find. While a user is in the rental, the owner cannot see any information from his vehicle and cannot access it either. This is only possible after the user himself/herself has finished the rental. Currently, the owner cannot end the user's rental either. This must be carried out by the user himself/herself.

A method in accordance with exemplary embodiments of the invention for securing a vehicle against unauthorized driving provides that the vehicle has such a driving authorization system as described above, according to one of the described design variants. Thus, in accordance with the method, it is provided that a deactivation of the access lock via the application requires an authorization that is stored in the backend and is saved, for example, as a time-limited authorization in the backend. The method thus ensures that only a user who has an application with a corresponding authorization can deactivate the access lock and, ultimately, the immobilizer. The authorization can be permanently stored for the owner of the vehicle, such that he/she can unlock and start the vehicle at any time via his/her application. For other users of a car-sharing project, the authorization is typically retrieved from the backend as a time-limited authorization. The process is thus similar to the prior art mentioned above, in that the owner of the vehicle unlocks his/her vehicle and invites the users he/she wants. These users then install the corresponding application with their personal access data on their mobile device. They can then request a reservation of the vehicle from the owner. Once the owner has confirmed the reservation, the user obtains, with the confirmed reservation/booking of the vehicle, a time-limited authorization, which is limited to the period of time in which he/she requested or booked the vehicle. He/she can seek out the vehicle at the requested time. If the user tries to start the rental too early, he/she will be denied access to the vehicle and cannot see the position of the vehicle either.

Accepted booking requests are stored/saved in the backend. The backend allows the application of an authorized user at the requested point in time to communicate with the connectivity unit via the backend. In this way, the user gets access to the vehicle.

A further design of the method according to the invention also provides that messages are sent to applications, in particular those of the vehicle owner, via the connectivity unit indirectly via the server, if unauthorized access and/or start attempts take place, in particular if a start attempt takes place while the immobilizer is active. Via such an in-app communication, at least the vehicle owner and, if applicable, the next authorized user, who may already be on the way to the vehicle, can be correspondingly informed. The messages are sent from the backend to the application. The backend receives status changes on the vehicle from the connectivity unit and processes them. If an "ignition on" event is received in the backend, the backend checks if the immobilizer is active. If this is the case, a message to the application is triggered from the backend. The connectivity unit supplies the input, the backend processes these and reacts accordingly.

A very advantageous development of the method according to the invention also provides that the application also has a function for exchanging messages between applications networked with the same vehicle and/or the server. This allows, for example, information such as the current location of the vehicle, current levels of the battery, fuel tank and the like to be transmitted, as well as possible breakdowns of the vehicle to be communicated in order to signal to a person who has booked the vehicle next that the vehicle may not be operational or only partially operational. In particular, they can also be informed if they need to find a gas station on their journey, such that the time required for this can be accordingly allowed for.

As already mentioned, the driving authorization system according to the invention makes it possible to access the vehicle via the connectivity unit. According to an advantageous development of the method according to the invention, the connectivity unit allows access to the vehicle from the backend, such that, for example, statuses of the vehicle can be called up, but actions can also be triggered with the vehicle. By way of example, the flashing of the vehicle mentioned above can be triggered via an application linked to the backend in order to find the vehicle more easily. The backend server then checks the authorization of the user of the application to trigger these processes accordingly and in the case that the user is authorized here, it forwards the commands to the connectivity unit of the vehicle, which then triggers the corresponding actions in the vehicle, for example a flashing of the vehicle, but also actions such as starting a pre-heater, stationary ventilation or similar.

A hierarchical structure, for example within a predetermined time window, allows special access rights for the owner of the vehicle and/or the vehicle manufacturer via the server. Further rights can be assigned, for example, to authorized users of the vehicle who have booked the vehicle, such that only these users can activate the flashing light, for example, in order to find the vehicle in a parking space more easily. Further functionalities can be reserved for the user, for example, the readout of the corresponding statuses of the vehicle or similar. The readout of the location of the current vehicle can also consistently be possible for the vehicle owner, for example, while it is only possible for the authorized user immediately before the time in which his/her booking is active, such that he/she can easily find the vehicle but cannot locate the owner of the vehicle or other users outside the time he/she has booked.

Another very advantageous design of the method according to the invention also provides that data and/or statuses and/or the location of the vehicle are transmitted to the backend sever and, if required, to one or more applications linked to the vehicle. This allows, for example, the vehicle owner and the user who next booked the vehicle, to be informed of the position of the vehicle, the geographic location or a local area in which the vehicle is located with an accuracy of 300 m or of 600 m. Other indications could be: the level of the fuel tank, the battery or similar, as already mentioned above.

BRIEF DESCRIPTION OF THE DRAWING FIGURES

Further advantageous designs of the driving authorization system and the method also emerge from the exemplary embodiment, which is described and explained with reference to the figures in more detail below.

Figure 2:
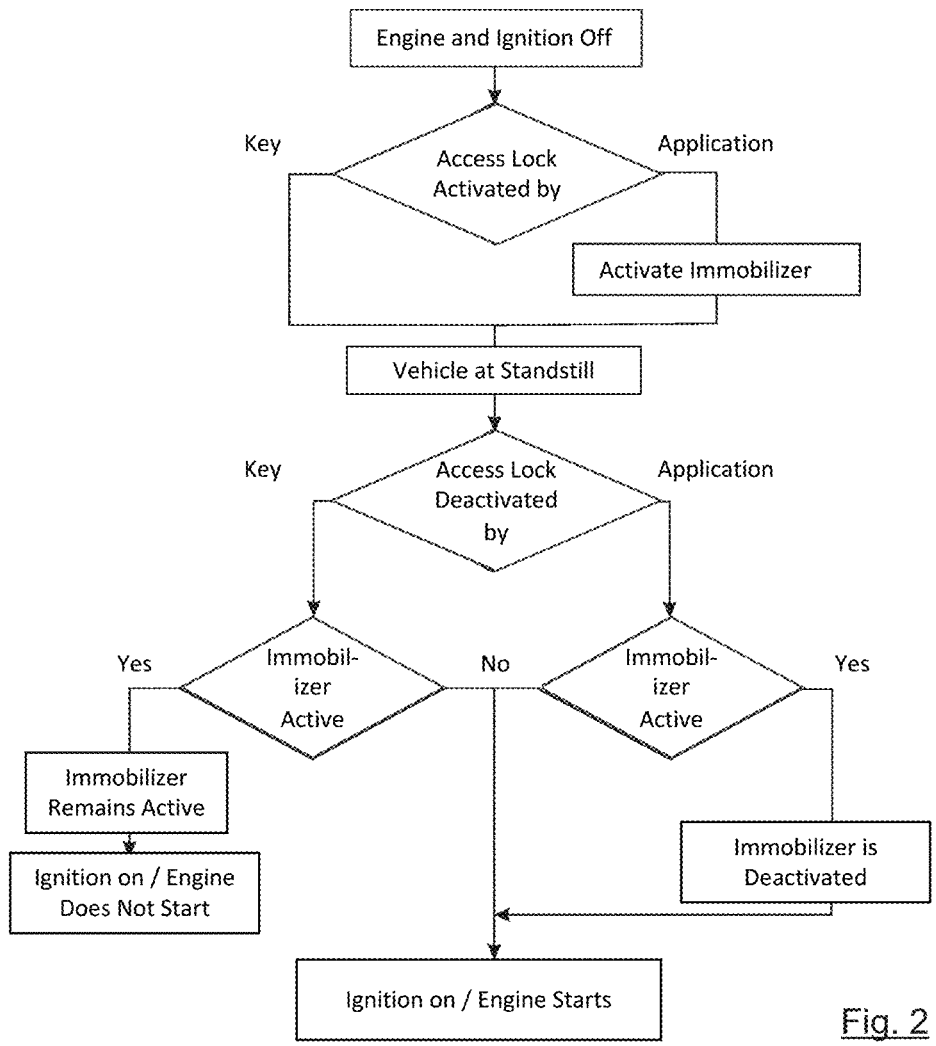

Here are shown:

FIG. 1 a scenario, in principle, for locking or unlocking a vehicle by an authorized user; and FIG. 2 a flow chart for checking whether the immobilizer is activated and/or deactivated depending on the type of locking and subsequent unlocking of the vehicle.

DETAILED DESCRIPTION

In the depiction of FIG. 1, a vehicle 1 is depicted as an example only. This vehicle has a driving authorization system 2, which comprises an access lock 3 and an immobilizer 4 as corresponding modules. The vehicle 1 is correspondingly networked via a connectivity unit 5, which can, for example, be designed as a so-called windshield unit. The connectivity unit 5 can receive, send and process commands and can trigger various functionalities in the vehicle 1. As indicated in the depiction of FIG. 1, it is at least in contact with the driving authorization system 2. The connectivity unit 5 is also connected to the server 7, in particular the backend of the manufacturer of the vehicle 1 or a third party, via a communication link 6 between it and a server 7. Furthermore, the scenario requires a mobile device 8 of a user 9, which has installed an application 10 or app, via which the user 9 participates in a car-sharing service, for example. The mobile device 8 communicates its commands to the server via the connection 13. This server checks whether there is an authorization for the incoming commands and opens the vehicle's access system by remote command. For the user, this has the effect that the application on the mobile device would communicate directly with the vehicle, symbolically depicted with the connection 11.

The various functionalities of the vehicle 1 or the connectivity unit 5 and the driving authorization system 2 connected to it are addressed accordingly, as are the functionalities of the server 7, which is indicated here, for example, as a Cloud, and of the mobile device 8 or the application 10 installed on it.

FIG. 1 furthermore depicts a key 12—which is electronic, for example—necessary for the use of vehicle 1 and which remains in the vehicle 1, for example, as outlined in the prior art described in the introduction.

The car-sharing service offered by the manufacturer of the vehicle 1, for example, now allows the customer of the vehicle manufacturer, in particular the owner of the vehicle 1, to share his/her vehicle with other users 9. For this purpose, the owner needs a corresponding networking of his/her vehicle 1 via the connectivity unit 5, which can be ordered as optional equipment or retrofitted accordingly, for example. By means of an application 10 provided to the owner by the vehicle manufacturer, the owner can now invite further users 9 to share the vehicle 1 with him/her and can simultaneously locate the vehicle 1 and lock and unlock it by activating or deactivating the access lock 3. The users 9 invited by him/her can use the vehicle after a successful registration for the service with the same application 10, in which they have to log in securely. Logging into the application 10 can be secured by a password, a pin or even biometric systems, such that only the actually authorized user 9 can use the application 10. In addition, there is a connection to the server 7 via the communication link 13 between the application 10 or the mobile device 8, such that the identity of the registered user 9 can be checked. This user can now book the vehicle 1 via the application 10 and the owner of the vehicle 1 can confirm or reject the booking if necessary. After a confirmed successful booking by the user 9, he/she can locate the vehicle 1 at the requested time via the application 10. Once he/she has reached the vehicle 1, the application 10 sets up the communication connection 13 to the server 7 on the mobile device 8 after actuation by the user and the authorized user 9 can unlock the vehicle 1 via the application 10 by deactivating the access lock 3 from the server 7 via the communication connection 6 to the connectivity unit. The required authorization check takes place on the server 7. In this way, it is ensured that only the users 9 with a confirmed booking are granted access to the vehicle 1. The owner of the vehicle 1 can access the vehicle 1 via his/her own application 10 and accordingly block the vehicle 1 for usage times desired in his/her own instance. The owner's access is blocked during the periods when a user is renting the vehicle. In particular, the service enables families, groups of friends, neighborhoods, residential communities or smaller businesses and shops to share a vehicle.

The service is based on a networked vehicle 1, which is connected to the server 7 via the connectivity unit 5, wherein the connectivity unit 5 is connected internally to a telematics control unit and as part of this, for example, to the addressed driving authorization system 2. The connectivity unit 5 thus functions as a kind of mailbox. It manages and processes the incoming and outgoing "post". This means that the processing can trigger corresponding commands and functionalities in the vehicle 1. The connectivity unit 5, which is also referred to as the windshield unit, has its own SIM card and a 3G radio connection. It can therefore be used over a wide area. It is of particular advantage if the connectivity unit 5 is equipped with the highest possible speed of command processing. The applicant's connectivity unit 5, for example, is capable of correspondingly implementing opening and closing processes, which are triggered in the application 10, within a maximum of two seconds.

By means of the connectivity unit 5, commands can thus be sent to the vehicle 1, which can, for example, cause a change of state in the driving authorization system 2 of the vehicle 1. The connectivity unit 5 can also include other capabilities. It can, if desired, transmit various vehicle data such as the fuel level, the status of the doors, i.e., whether they are open or closed, the vehicle status with regard to the communication link 6, i.e., whether it is online or offline, the position of the vehicle 1 and the like to the server 7. Further information and statuses are possible here, but are of secondary importance for the present invention, which is why they will not be discussed further.

In addition to providing data, the connectivity unit 5 can also receive and process data and commands itself. This means, for example, that a defined access to the vehicle 1 can take place. Such access can be controlled centrally via the sever 7 of the vehicle manufacturer or a third party, for example to prevent misuse of the vehicle 1 by third parties. The vehicle manufacturer takes all security-relevant measures for the communication link 6 between the server 7 and the connectivity unit 5 in order to grant only the owner of the vehicle 1 and the persons authorized by him/her access to the vehicle 1 in the manner desired by the user via their applications 10 on their mobile devices 8. By triggering commands in the vehicle by means of the connectivity unit 5, further functions can also be triggered, such as flashing of the vehicle in order to locate it more easily in a parking space, the activation or deactivation of the access lock, as already mentioned, as well as further functionalities in the vehicle 1, which are of secondary importance for the present invention and therefore do not need to be explained in detail.

The connectivity unit 5 can thus be integrated into the telematics control unit, which also includes the driving authorization system 2, such that only a single module with all necessary functionalities has to be installed in the vehicle 1.

As already mentioned, the application 10 is made available to the vehicle manufacturer's customers accordingly, in order to offer different services. In particular for car-sharing, the user needs the application 10, for example as a car owner, to invite users 9 to reject or accept booking requests, to locate the vehicle 1 and to activate or deactivate the access control 3. Alternatively, the application can also be used via a PC, laptop or tablet instead of on a mobile device 8. Only the functionality of locking and unlocking requires a terminal device 8 which is sufficiently mobile to be brought close to the vehicle 1.

Via the application 10, for example, free booking times for the vehicle can thus be viewed. Via an integrated notification function, users 9 can contact the owner of the vehicle 1 or even an administrator in the region of the server 7 to make a booking or to contact a support or to evaluate the vehicle 1 after the end of the booking, to communicate information such as damages, low fill levels or similar. If a booking lasts longer than specified, the authorized user 9 has the option to extend the booking in the application 10. In addition, the invited user 9 receives information about the vehicle 1 as well as the costs of the booking, if booking prices are stored by the owner of the vehicle 1. A corresponding help function and similar is also integrated in the application 10.

The application 10 now functions as a keyless access authorization system to the vehicle 1 in the context of the shared use of the vehicle 1. Via the application 10, the access lock 3 can be activated or deactivated accordingly, i.e., the vehicle 1 can be locked or unlocked. The key 12 remains in the vehicle 1, as already indicated in the prior art mentioned above, and thus enables the authorized user 9, who has unlocked the vehicle 1 via his application 10, to use the vehicle and start the engine.

In order to now avoid the simplified theft of the vehicle 1 by means of the key 12 left in the vehicle 1, the vehicle 1 is equipped with the immobilizer 4 already mentioned. As long as the vehicle 1 is not unlocked using the application 10, the immobilizer 4 remains substantially active and prevents the engine from being started using the key 12. Only when the access lock 3 is deactivated by the application 10 is the immobilizer 4 deactivated and a starting of the engine using the key 12 or a key 12 located in the vehicle is allowed.

The booking process now takes place in such a way that after the user 9 has registered and signed in, he/she logs in to the application 10 with his/her personal access data. The user 9 now has the possibility of booking the vehicle 1 if it is available. He/she selects his/her desired booking period and estimates the distance to be driven. If desired, he/she can also send a message to the vehicle owner via the application 10. In the course of the booking process, the user 9 receives information about the vehicle 10 and the automatically calculated costs of the booking, if the vehicle owner has stored the booking prices. Once the process is complete, the booking request is sent to the owner of the vehicle 1, who receives this as a push-notification and decides via his/her application 10 whether to accept or reject the booking. He/she also has the option of blocking the vehicle 1 with a calendar during certain periods in which he/she wants to use it himself/herself, for example, or to use it himself/herself during free periods which have not been booked. There is thus no booking process for the vehicle user himself/herself, but personal use of the vehicle 1 is in fact not possible during a booking by another user 9.

The immobilizer 4 represents a security mechanism that protects the vehicle 1 against theft and yet allows such a keyless transfer of the vehicle 1 with the key 12 located in the vehicle. Since the owner of the vehicle 1 must provide the invited user 9 with a corresponding key in order to start the vehicle 1, it is necessary that this key remains in the vehicle 1. The additional security mechanism by means of the immobilizer 4 is therefore necessary to prevent an authorized user 9 from using a possibly stolen vehicle key 12 to drive again after the end of the booking without the authorization of the owner and to prevent a possible burglar from stealing the vehicle 1, since the burglar could otherwise simply drive away due to the key 12 located in the vehicle 1.

The immobilizer 4 now substantially complies with the functionality, which is depicted accordingly in the flow chart in FIG. 2. For easier explanation, the return process for the vehicle 1 will be discussed first. When the end of the booking is reached, the authorized user 9 of the vehicle 1 closes the doors and locks the vehicle via the application while the key 12 is still in the vehicle 1. The access lock 3 is therefore activated accordingly. If this takes place via the application, then the immobilizer 4 is activated, as can be seen in the depiction in FIG. 2. If the locking is carried out via the key, and then typically by the owner of the vehicle 1 or by the authorized user if he/she only briefly leaves the vehicle 1 before the end of the booking, then the immobilizer 4 is not activated. After the vehicle 1 has been subsequently immobilized, the vehicle 1 is used again, for example by the authorized user 9 or the owner. If the access lock 3 is deactivated by the application 10 and the immobilizer 4 was active because the activation of the access lock 3, i.e., locking the vehicle 1, via the application 10 has occurred, then these must be deactivated in accordance with the deactivation of the access lock 3 by the application 10, as is indicated by the far right arm in the diagram in FIG. 2. Subsequently, the ignition can be switched on and the engine started. If the vehicle 1 has previously been locked with the key, opening with the key, ultimately results in the immobilizer 4 not being activated. In the diagram in FIG. 2, the immobilizer which was not activated will not prevent the vehicle 1 from being driven away, such that even in this case, the ignition can be switched on and the engine started.

In the case of misuse, the vehicle 1 would now be locked accordingly via the application 10, for example by the vehicle owner because he wants to make the vehicle available to other authorized users 9, or by the authorized user 9 when he leaves the vehicle 1 at the end of the booking. In this case, the immobilizer 4 is activated. If the vehicle 1 were now opened with a stolen key 12, for example, the immobilizer 4 would still be active and would remain active due to the fact that the vehicle 1 has not been unlocked in an authorized manner via the application 10. In this case, the branch drawn on the far left of the diagram in FIG. 2 comes into play. The immobilizer 4 remains active. The person who has entered the vehicle 1 in an unauthorized manner can indeed enter the vehicle 1 and, where applicable, switch on the ignition, but the engine itself will not start. Therefore, only by unlocking the vehicle 1 via the application 10 can the immobilizer 4, which was previously activated when the vehicle 1 was locked via the application 10, be deactivated again.

This makes it possible to create a very secure system in which the key 12 can remain in the vehicle 1, such that the vehicle 1 can be passed on to authorized users 9 without handing over the key 12, but still securely.

If there is an attempt to gain unauthorized access by deactivating the access lock 3 and simultaneously keeping the immobilizer 4 active, i.e., the left branch in the depiction in FIG. 2, then a notification can also be sent to the vehicle owner and/or the server 7, such that the unauthorized use attempt is made known.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A driving authorization system for a vehicle, the driving authorization system comprising:
 a connectivity unit configured to communicate at least with a key and a keyless access authorization system, wherein the keyless access authorization system is an application on a mobile device;
 a server;
 an access lock, which is activatable and deactivatable by the key, the application, and/or the keyless access authorization system; and
 an immobilizer, wherein the immobilizer is configured in such a way that the immobilizer is activated when the access lock is activated by the application and is deactivated again, after the immobilizer is activated when the access lock is activated by the application, only when the access lock is deactivated by the application, wherein the immobilizer is only set to an activatable state after the vehicle has been successfully booked with an owner of the vehicle, and
 wherein the connectivity unit is further configured to transmit messages to an application on a mobile device of an owner of the vehicle, indirectly via the server, responsive to unauthorized attempts to access and/or start the vehicle.

2. The driving authorization system of claim 1, wherein the application is secured via an access control.

3. The driving authorization system of claim 1, wherein the connectivity unit is configured to receive, transmit, and process commands and/or to trigger functions in the vehicle.

4. A method for securing a vehicle against unauthorized driving, wherein the vehicle has a driving authorization system, which comprises a connectivity unit configured to communicate at least with a key and a keyless access authorization system, wherein the keyless access authorization system is an application on a mobile device, a server, an access lock, which is activatable and deactivatable by the key, the application, and/or the keyless access authorization system, and an immobilizer, the method comprising:
 activating the immobilizer when the access lock is activated by the application; and
 deactivating the immobilizer, after the immobilizer is activated when the access lock is activated by the application, only when the access lock is deactivated by the application,
 wherein a deactivation of the access lock via the application requires an authorization for the requesting application of the respective user, wherein the authorization is permanently stored on the server or is called up by the server as a time-limited authorization,
 wherein the authorization is generated on the server after a successful booking of the vehicle with an owner of the vehicle, and messages are transmitted from the server to both the connectivity unit of the vehicle and to the application on the mobile device by a user,
 wherein the immobilizer is only set to an activatable state after the vehicle has been successfully booked with the owner of the vehicle, and
 wherein the connectivity unit transmits messages to an application on a mobile device of an owner of the vehicle, indirectly via the server, responsive to unauthorized attempts to access and/or start the vehicle.

5. The method of claim 4, wherein the application has a function for exchanging messages between a number of applications linked to the vehicle and/or the server.

6. The method of claim 5, wherein access to the vehicle is performed via the connectivity unit and the server, wherein the access is triggered by the server or by one of the applications linked to the vehicle, wherein access rights are hierarchically structured within a predetermined time window.

7. The method of claim 4, wherein data, statuses, and/or the location or the region where the vehicle is located are transmitted to the server and transmitted to one or more applications linked to the vehicle.

\* \* \* \* \*